March 25, 1958     C. C. FUERST     2,827,839
TWO-BLADE SWINGING SHUTTER FOR CAMERA Filed June 6, 1955                       3 Sheets-Sheet 1

CARL C. FUERST
INVENTOR.

BY

ATTORNEYS

March 25, 1958  C. C. FUERST  2,827,839
TWO-BLADE SWINGING SHUTTER FOR CAMERA
Filed June 6, 1955  3 Sheets-Sheet 2

CARL C. FUERST
INVENTOR.

BY
ATTORNEYS

March 25, 1958

C. C. FUERST 2,827,839

TWO-BLADE SWINGING SHUTTER FOR CAMERA

Filed June 6, 1955

CARL C. FUERST
INVENTOR.

BY *Daniel I. Mayne*

*Donald H. Stewart*

ATTORNEYS

United States Patent Office 2,827,839
Patented Mar. 25, 1958

2,827,839

TWO-BLADE SWINGING SHUTTER FOR CAMERA

Carl C. Fuerst, Rochester, N. Y., assignor to Eastman Kodak Company, Rochester, N. Y., a corporation of New Jersey Application June 6, 1955, Serial No. 513,409

3 Claims. (Cl. 95—58)

This invention relates to photography and more particularly to shutters for photographic cameras.

In the past there have been broadly two types of shutters used on cameras employing interchangeable lenses. The focal plane curtain shutter is perhaps the most satisfactory type since this shutter operates between the objective and focal plane and it permits objectives to be attached and detached to the front of the camera and at the same time gives an efficient exposure when a slot between the curtains crosses the light beam. One difficulty with this type shutter is that they are quite expensive and require considerable delicate mechanism for the best results. A second type of interchangeable lens camera employs a between-the-lens shutter inside of the camera and behind the objective. Such shutters are usually not satisfactory because they tend to reduce the light around the margin of the exposure area and to properly expose only in the center.

My present invention is particularly directed to providing a comparatively simple and inexpensive type of shutter which will permit the use of interchangeable lenses on cameras and which is of such construction that an even exposure may be given to the entire exposed area. One object of my invention is to provide a simple swinging blade shutter in which the shutter mechanism may be arranged to swing either closely behind the objective or closely in front of the exposure plane. Another object of my invention is to provide a setting shutter of the type in which each shutter blade moves in one direction only while an exposure is being made and in which each shutter blade is provided with an opening which may swing through the entire light cone in such a manner that an even exposure may be given upon a film lying in the focal plane. Another object of my invention is to provide a shutter in which the exposure opening is completely open during the time the shutter blades are retarded in their movement for a controlled time of automatic exposures. Still another object of my invention is to provide a shutter in which a cover blind normally lies over the exposure aperture insuring a completely light-tight closure and in which the cover blind is automatically removed from the exposure opening just in advance of the release of the shutter blades to make an exposure. Other objects will appear from the following specification, the novel features being pointed out in the claims at the end thereof.

Coming now to the drawings in which like reference characters denote like parts throughout:

Figure 1:
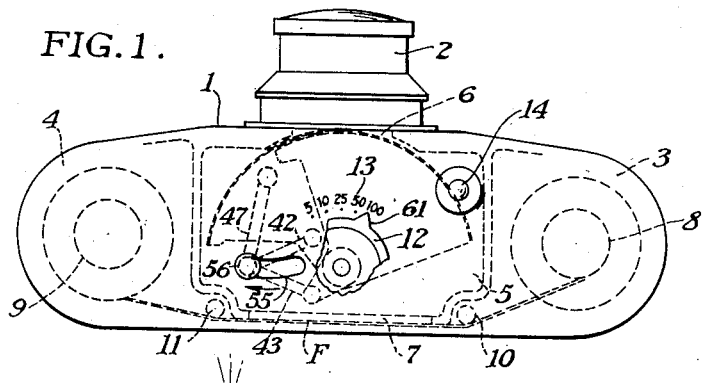
Fig. 1 is a top plan view of a camera including a shutter constructed in accordance with and embodying a preferred form of my invention. The shutter parts are schematically shown and many parts are omitted for the sake of clearness in this view.
Figure 2:
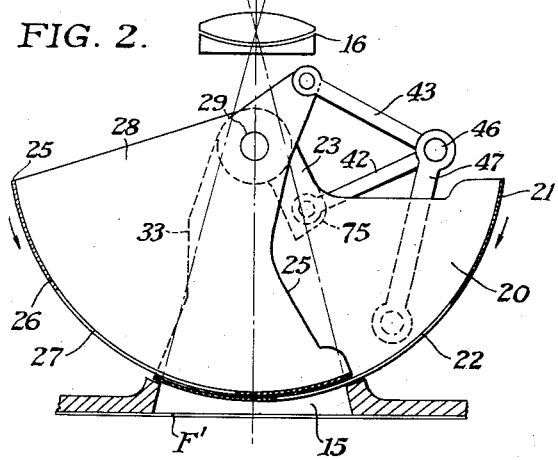
Fig. 2 is a schematic top plan view diagrammatically showing a second preferred form of my invention in which the shutter blades swing past the exposure frame of the camera.
Figure 3:
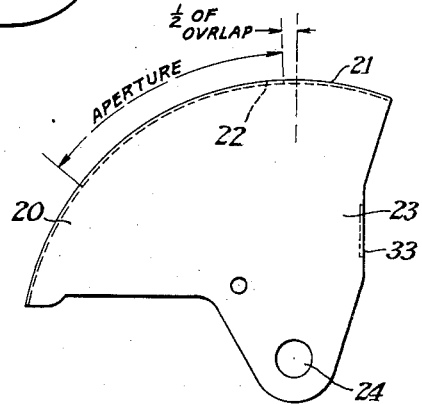
Fig. 3 is a top plan view of the outer shutter blade.

As will be noted from Figs. 1 and 2, my improved shutter may be mounted in either of two positions; that is, the shutter blades may cut the light cone close to the camera objective as in Fig. 1 or the shutter blades may cut the light cone close to the focal plane of the film as in Fig. 2. Since this shutter employs exactly the same blade structure and operating mechanism for either of these two positions, the shutter parts themselves will be given the same reference characters throughout.

My improved shutter includes a pair of shutter blades having arcuate surfaces and having rectangular openings in the arcuate surfaces so that they may make an exposure in swinging about an axis, each blade being pivotally mounted to swing about the same axis. One blade has an arcuate surface of larger diameter than the other so that the two blades may swing at the same time and in opposite directions to make an exposure. A toggle mechanism connects the blades so that they may be driven together.

Mores specifically, Fig. 1 illustrates a typical camera having a front wall 1 on which an objective 2 may be detachably mounted. The camera broadly includes the usual film spool chambers 3 and 4 and an inner light-tight chamber 5 which encloses the shutter mechanism. In this instance there is a front exposure aperture 6 across which the shutter blades move to make an exposure. There is also the usual exposure frame 7 which may support a film F which is moved from a supply spool 8 to a take-up spool 9 over guide rolls 10 and 11 as shown. The shutter may include a speed setting dial or arm 12 movable over a speed scale 13 and may include a trigger member 14 for releasing the shutter for an exposure.

The second embodiment of my invention, as shown in Fig. 2, shows diagrammatically the same shutter arranged to move across an exposure frame 15 which supports a film F1 close to the exposure frame so that the light cone in this instance is cut close to the film. The objective 16 is diagrammatically shown as being spaced from the film exposure frame.

The shutter itself may consist of an outer shutter blade 20 having an arcuate surface 21 provided with an aperture 22 through which light passes in making an exposure. The shutter blade 20 is provided with a pair of radially extending arms 23 (Fig. 7) which are apertured at 24 so that the blade may swing freely about an axis 40 and 41 passing through the apertures 24.

The inner shutter blade 25 may also have an arcuate surface 26 with a rectangular aperture 27 and this shutter blade 20 is provided with radially extending arms 28 with apertures 29 to swing about an axis so that the two blades will swing in concentric relationship. In the present form of shutter blades the diameter of the inner shutter blade arcuate surface 26 is slightly less than the diameter of the outer shutter blade arcuate surface 21 so that, as indicated in Fig. 2, the two blades will lie close together but will clear each other so that they may swing freely in opposite directions.

Figure 5:
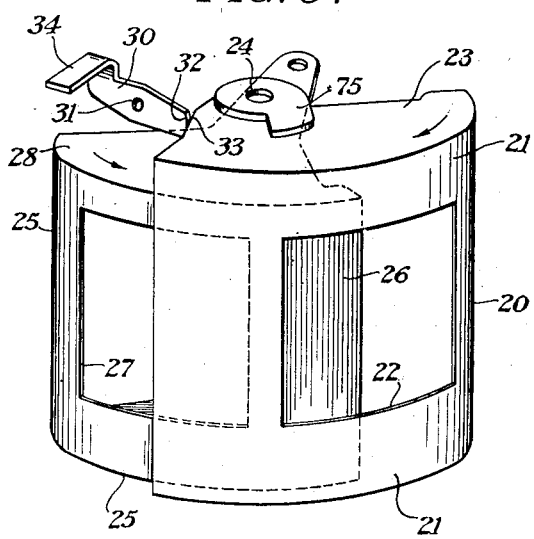
Fig. 5 is a perspective view showing the relationship of the inner and outer shutter blades and showing one form of a shutter release which may be used with my improved shutter.
Figure 4:
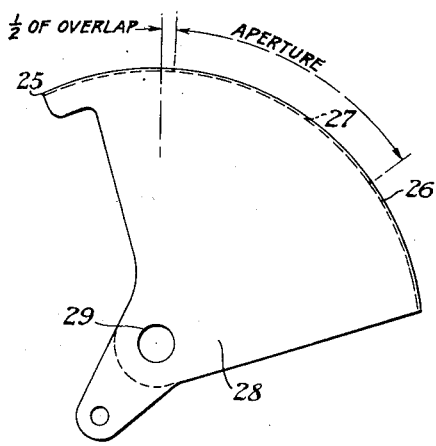
Fig. 4 is a top plan view of the inner shutter blade.

Fig. 5 shows the relationship of the two shutter blades assembled and likewise shows a latch 30 pivoted at 31 and including a latching end 32 adapted to engage an edge 33 on the outer shutter blade 20 in a set position. Lever 30 has a turned-over finger 34 which may lie in the path of a turned-over lug 36 carried by the cover blind 37 so that this lug 36 in turn may contact with the turned-over finger 34 of lever 30 to release the shutter blades after the cover blind swings from its dashed line position in Fig. 7. A spring 38 normally holds the cover blind 37 over an exposure aperture 39.

Figure 6:
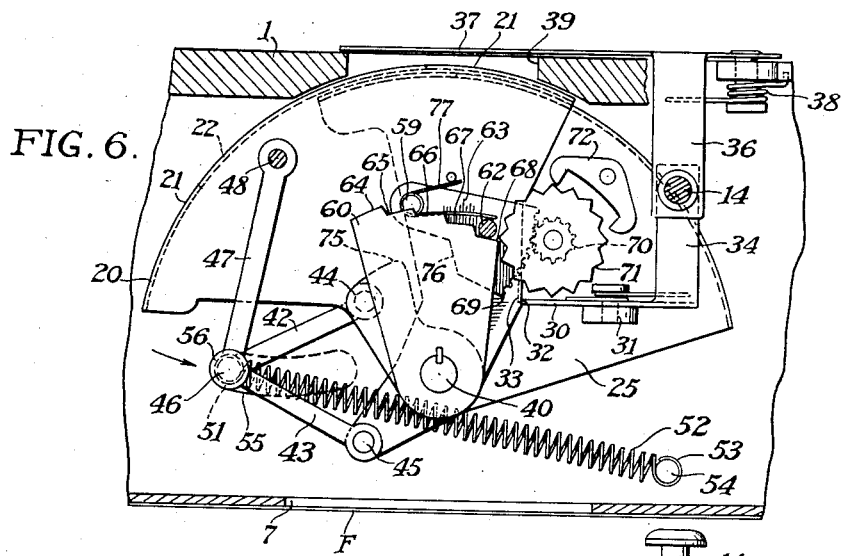
Fig. 6 is a fragmentary top plan and sectional view of the first preferred form of my invention with the shutter blades in a set position ready to make an exposure.
Figure 7:
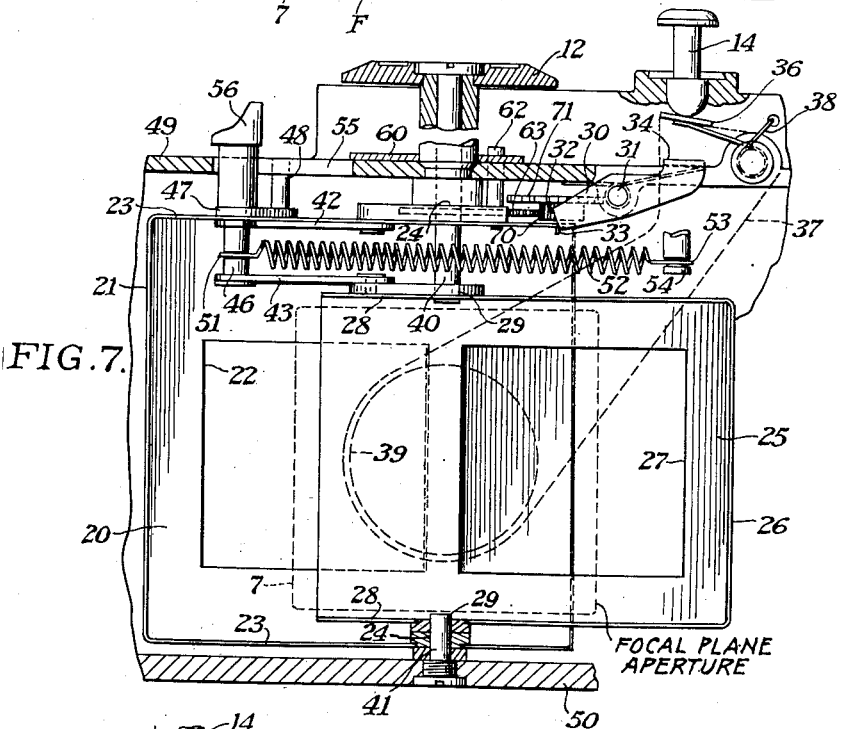
Fig. 7 is a rear elevation of the shutter shown in Fig. 6, certain parts being omitted for the sake of clearness.
Figure 8:
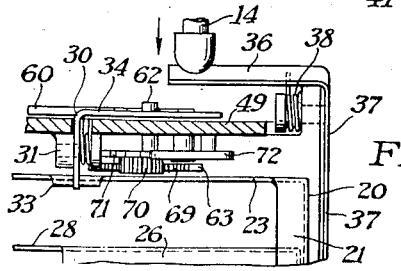
Fig. 8 is a fragmentary detail view showing in elevation a portion of the shutter blades and the shutter blade tripping mechanism, and taken on line 8—8 of Fig. 7.

Referring to Fig. 6, it will be noted that the outer shutter blade 20 and the inner shutter blade 25 are coaxially pivoted upon the spaced studs 40 at the top and 41 at the bottom. In order to move the shutter blades together there are toggle links 42 and 43, 42 being pivoted at 44 to the outer shutter blade 20 and 43 being pivoted at 45 to the inner shutter blade 25. These toggle links are pivoted together at 46 and this pivot also supports one end of a swinging guide lever 47 which as shown in Fig. 7, is pivoted at 48 to the top wall of the camera casing 49. The bottom wall of the camera casing 50 supports the stud 41.

The stud 46 carries one end 51 of a coil drive spring 52, the other end of which 53 is attached to a stud 54 of the shutter casing. It will be noted that the present construction permits the use of a relatively long spring and the driving angle permits the shutter blades to be driven at quite a high speed. In actual practice I have found it quite possible to drive shutter blades of a size required for a 35 mm. camera at a speed to produce 1/400 of a second exposure and with a comparatively simple retard mechanism to obtain automatically controlled exposure speeds of approximately 1/5 of a second, although this data is given only by way of an example to indicate that a reasonable range of exposures can readily be obtained.

The shutter is of a setting-type and the stud 46 for the purpose of illustration may be extended upwardly through a slot 55 in the shutter casing to provide a setting handle 56. In setting the shutter, this handle is moved to the left of Figs. 6 and 7 and the latch element 32 engages the latch element 33 of the outer shutter member 20 as indicated in Fig. 7 to hold the parts in their set position. When the trigger 14 is depressed, the shutter blades are released and the spring 50 and the toggle links 42 and 43 rapidly move the two shutter blades in opposite directions so that the rectangular slots 21 and 27 by passing each other open and close the exposure aperture 29.

Figure 9:
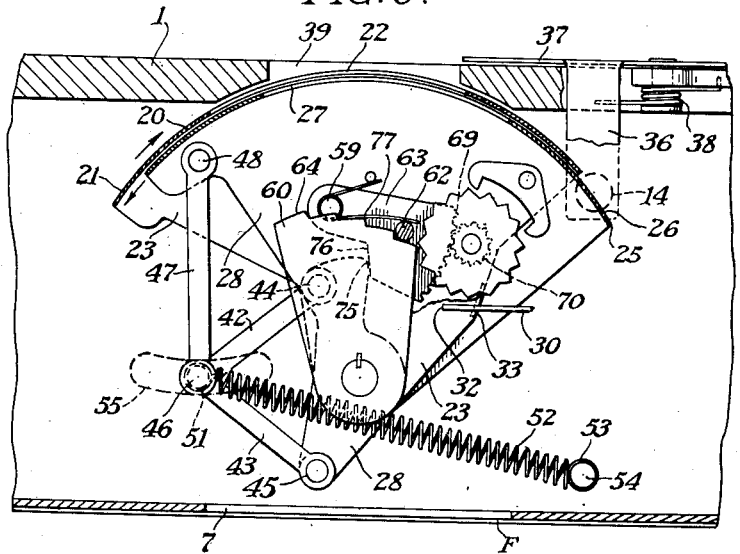
Fig. 9 is a view similar to Fig. 6 but with the shutter parts in a position which they pass through during an exposure making movement and during a retarded exposure.

It may be noted that the length of the slots 21 of the outer shutter member, and 27 of the inner shutter member, are at least as long as the diameter of the exposure opening 39, as shown in Fig. 9. One reason for this is that the retarding mechanism, which will now be described, may be positioned to retard the shutter members so that they may move and still fully uncover the exposure aperture while they are retarded for slow speeds such as 1/10, 1/5, or 1/25 of a second. In fact, it is usually customary to retard all except the highest speeds and that has been done in the present instance.

Referring to Fig. 6, it will be noticed that there is a cam segment 60 which may be adjusted by swinging about the stud 40 which stud is keyed to the cam segment so that when a dial 12 is moved until a pointer 61 lies opposite the desired shutter speed graduation 13, one of the step cams will position a stud 62 carrying a gear segment 63 pivoted at 59. These step cams 64, 65, 66, 67 and 68 are so arranged that the teeth 69 on the gear segment 63 may mesh in different amounts with the pinion 70 carried by the star wheel 71 which may be engaged by a pallet 72. When the shutter blades swing, the outer shutter blade 20 carries a cam 75 which will swing freely until the shutter blades are in an open or Fig. 9 position, at which time the cam 75 will strike a shoulder 76 on the gear segment and cause it to rock, thereby turning the star wheel pallet and causing the blades to move slightly with the apertures still fully open until the shoulder slips off permitting the blades to continue and rapidly close. While I have shown a very simple form of retard device and one sufficient for the range of exposures indicated in Fig. 1, a more elaborate retard can readily be applied consisting of a gear train as long as may be required for a greater range of exposures.

A light spring 77, as indicated in Fig. 9, tends to hold the pin 62 against one of the step cams so that the retard acts against the force of this spring as well as against the inertia of the gear, segment gear, star wheel and pallet.

Figure 10:
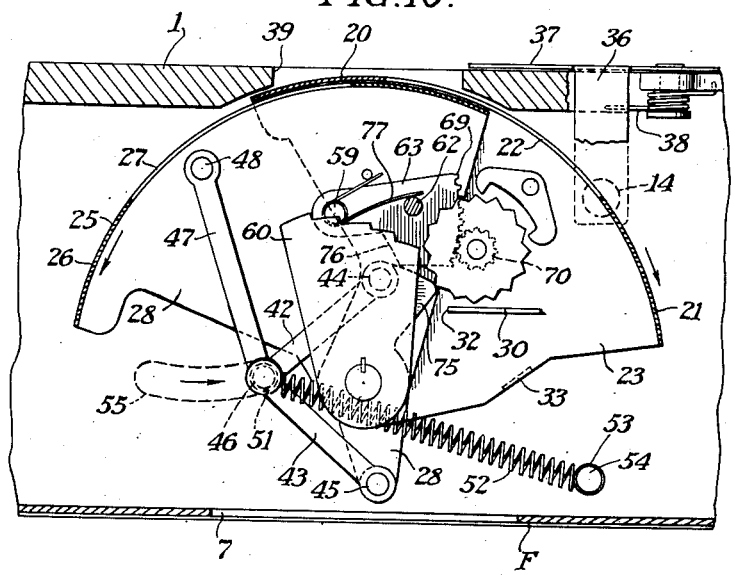
Fig. 10 is a view similar to Figs. 6 and 9 but with the shutter parts in a position they assume after an exposure has been completed.

Fig. 9 shows the shutter blades as they are slightly moving with the exposure aperture 39 uncovered and Fig. 10 shows the position of the parts after the slip-off occurs and after the spring 52 has moved the shutter blades to their fully closed position. In this position when the trigger member 14 is released, the cover blind 37 returns to its aperture covering position at which time the shutter blades 20 and 25 may be set by moving the setting lever 56 through its axis slot 55 until the blades are again latched in a tensioned position by means of latch 30.

While I have described two preferred embodiments of my invention, it is obvious that numerous variations may suggest themselves to those skilled in the art and I consider as within the scope of my invention all forms which may come within the scope of the appended claims. The illustrated forms of my invention are well adapted for use on a camera requiring interchangeable lenses of different focal lengths and provide a relatively inexpensive simple type of multispeed shutter which is efficient and which provides a means for giving an even exposure completely across that area of the film which is exposed.

I claim:

1. A camera shutter comprising an apertured support, a shutter-exposing mechanism including a pair of apertured curved blade members, one having a longer radius of curvature than the other, each blade including parallel arms extending in spaced relationship to common pivotal supports whereby the blades may swing past the apertured support and each other, each shutter blade including wings on each side of the aperture of a length at least half that of the aperture in the apertured support whereby the aperture of the apertured support may be completely covered by the wings, a pair of toggle links pivotally connected together having a free end of one link connected to one shutter blade and the free end of the other toggle link connected to the other shutter blade, the connections between the toggle links and the shutter blades being equally spaced from the pivotal support for the shutter blades, the connections to the shutter blades lying on opposite sides of a line connecting the pivotal connection of the pair of links and the pivotal support of the shutter blades whereby said shutter blades may move together and in opposite directions about their pivotal supports, a power spring connected to the pivotally connected toggle links at one end and to the shutter at the other end, a third link connected to the pivotal connection between the toggle links and having the opposite end pivoted to the shutter to guide the movement of the shutter blade driving toggle, a shutter latch for engaging and holding the shutter blades and the drive spring in a set position, means for moving the shutter blades to a set position whereby one shutter blade may engage the latch, and a trigger operably positioned to release the latch for making an exposure after the shutter blades have been set.

2. A camera shutter comprising an apertured support, a shutter-exposing mechanism including a pair of apertured curved blade members, one having a longer radius of curvature than the other, each blade including parallel arms extending in spaced relationship to common pivotal supports whereby the blades may swing past the apertured support and each other, each shutter blade including wings on each side of the aperture of a length at least half that of the aperture in the apertured support whereby the aperture of the apertured support may be completely covered by the wings, a pair of toggle links pivotally connected together having a free end of one link connected to one shutter blade and the free end of the other toggle link connected to the other shutter blade, the connections between the toggle links and shutter blades being equally spaced from the pivotal support for the shutter blades, the connections to the shutter blades lying on opposite sides of a line connecting the pivotal connection of the pair of links and the pivotal support of the shutter blades whereby said shutter blades may move together and in opposite directions about their pivotal supports, a power spring connected to the pivotally connected toggle links at one end and to the shutter at the other end, a third link connected to the pivotal connection between the toggle links and having the opposite end pivoted to the shutter to guide the movement of the shutter blade driving toggle, a shutter latch for engaging and holding the shutter blades and the drive spring in a set position, means for moving the shutter blades to a set position whereby one shutter blade may engage the latch, and a trigger operably positioned to release the latch for making an exposure after the shutter blades have been set, said trigger including a cover blade spring pressed into an exposure aperture closing position and movable to uncover the exposure aperture in advance of releasing the blade latch.

3. A camera shutter comprising an apertured support, a shutter-exposing mechanism including a pair of apertured curved blade members, one having a longer radius of curvature than the other, each blade including parallel arms extending in spaced relationship to common pivotal supports whereby the blades may swing past the apertured support and each other, each shutter blade including wings on each side of the aperture of a length at least half that of the aperture in the apertured support whereby the aperture of the apertured support may be completely covered by the wings, a pair of toggle links pivotally connected together having a free end of one link connected to one shutter blade and the free end of the other toggle link connected to the other shutter blade, the connections between the toggle links and the shutter blades being equally spaced from the pivotal support for the shutter blades, the connections to the shutter blades lying on opposite sides of a line connecting the pivotal connection of the pair of links and the pivotal supports of the shutter blades whereby said shutter blades may move together and in opposite directions about their pivotal supports, a power spring connected to the pivotally connected toggle links at one end and to the shutter at the other end, a third link connected to the pivotal connection between the toggle links and having the opposite end pivoted to the shutter to guide the movement of the shutter blade driving toggle, a shutter latch for engaging and holding the shutter blades and the drive spring in a set position, means for moving the shutter blades to a set position whereby one shutter blade may engage the latch, and a trigger operably positioned to release the latch for making an exposure after the shutter blades have been set, said trigger including a cover blade spring pressed into an exposure aperture closing position and movable to uncover the exposure aperture in advance of releasing the blade latch, the apertures in the shutter blades being of greater length than the length of the exposure aperture whereby each blade may move a distance while the exposure aperture is completely uncovered, and a retard mechanism operated by the moving shutter blades while the exposure aperture is fully open to produce a retarded speed of exposure.

References Cited in the file of this patent

UNITED STATES PATENTS

| | | |
|---|---|---|
| 615,296 | Mosher | Dec. 6, 1898 |
| 1,000,343 | Plant | Aug. 8, 1911 |
| 2,017,979 | Mayo | Oct. 22, 1935 |
| 2,198,602 | Carey | Apr. 30, 1940 |
| 2,338,657 | Mihalyi | Jan. 4, 1944 |
| 2,384,639 | Riddell | Sept. 11, 1945 |
| 2,507,149 | Fuerst | May 10, 1950 |